(12) United States Patent
Lowe et al.

(10) Patent No.: US 7,574,801 B2
(45) Date of Patent: Aug. 18, 2009

(54) SINGLE SET GEOMETRY METHOD FOR ASSEMBLY OF A VEHICLE

(75) Inventors: James Lowe, Temperance, MI (US); Dragan Stojkovic, Southgate, MI (US); Larry Dupuis, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 483 days.

(21) Appl. No.: 11/154,037

(22) Filed: Jun. 16, 2005

(65) Prior Publication Data

US 2006/0283015 A1 Dec. 21, 2006

(51) Int. Cl.
*B21D 53/88* (2006.01)
(52) U.S. Cl. ..................................... 29/897.2
(58) Field of Classification Search ................ 29/897.2, 29/464, 466, 467, 469, 468, 407.09, 281.1
See application file for complete search history.

(56) References Cited

U.S. PATENT DOCUMENTS

| | | | |
|---|---|---|---|
| 6,099,039 A | 8/2000 | Hine | |
| 6,227,321 B1 | 5/2001 | Frascaroli et al. | |
| 6,412,857 B2 | 7/2002 | Jackel et al. | |
| 6,416,119 B1 | 7/2002 | Gericke et al. | |
| 6,502,653 B1 | 1/2003 | Balzer et al. | |
| 6,533,348 B1 | 3/2003 | Jackel et al. | |
| 6,691,392 B2 * | 2/2004 | Savoy et al. | ............. 29/407.09 |
| 2001/0050497 A1 | 12/2001 | Jackel et al. | |
| 2002/0070572 A1 | 6/2002 | Stol et al. | |
| 2003/0085592 A1 | 5/2003 | Seksaria et al. | |

* cited by examiner

*Primary Examiner*—John C Hong
(74) *Attorney, Agent, or Firm*—Frederick Owens; Miller Law Group, PLLC

(57) ABSTRACT

An improved method of manufacturing an assembly comprising at least two components. Assembly components are attached together to form a combined assembly. The combined assembly is engaged by a single framing fixture that establishes the spatial relationships between each of the assembly components. After the spatial relationships are final, the assembly is fixed having securing points that are accessible when engaged by the single framing fixture. The method significantly reduces the load-weld-load sequences used in conventional body-in-white framing processes for motor vehicles.

16 Claims, 6 Drawing Sheets

SINGLE SET GEOMETRY METHOD FOR ASSEMBLY OF A VEHICLE

BACKGROUND OF THE INVENTION

1. Field of the Invention

The present invention relates to the assembly and subassembly of an automobile. More specifically, it relates to a method for assembly of a body-in-white (BIW) of an automobile.

2. Background Art

A major goal of the automobile manufacturer is to employ an assembly process that minimizes the total dimensional variation of the finished automobile body. The total dimensional variation represents the intrinsic variation in parts, subassemblies, and materials, as well as the variation induced by the sequences and methods used during assembly. Fit and finish represents one method of characterizing the total dimensional variation of an automobile. It is a subjective measure of the quality of the assembled automobile in terms of the sizes and gaps between adjacent body surfaces and the flushness of different surfaces. One example is the spatial relationship of the hood to fender or the hood to the leaf screen. Other examples might include the leaf screen to fender, hood to grille, or fender to door relationships.

Body-in-white (BIW) is a term used in automobile assembly to describe a structurally rigid frame of a partially completed vehicle body before the powertrain, exterior trim, and interior components are installed. The BIW typically comprises the underbody, side frames, front or rear headers, roof, and the back panel. The doors, hood, deck-lid panels, windshield, and backlight (i.e., closure surfaces) are installed into the openings of the assembled BIW. Many of the assembly and securing-together steps involved in producing the BIW are automated operations. While a few bodies are still manually assembled and welded, the recent years have generated numerous automated and semi-automated framing systems. Therefore, if the dimensional variation of the BIW is improved, fit and finish of the closure panels would improve also. The automobile industry has developed standard procedures for measuring the total dimensional variation of each BIW as it is assembled.

Dimensional variability, even in the thousandths of an inch represents a continuous challenge for automobile assembly operations. Conventional manufacturers often assemble vehicles by employing a strategy of attaching one incremental part at a time. Individual components of the vehicle BIW, for instance a dash panel, might undergo preliminary sub-assembly operations as it moves between various assembly stations. The individual BIW moves in a specific sequence between individual assembly stations designed to further integrate the partially completed BIW carcass with additional vehicle components by affixing additional parts to the assembly using by welds, glue, bolts, etc. Moreover, individual BIW subassembly components may be affixed together at a sub-assembly station in the assembly process to form a rigid portion of the partially completed BIW carcass. As additional components are rigidly added to the BIW carcass, the spatial relationships, as well as the relative position between one component and another is established. By loading each of these additional components into each station's framing jig or fixture, and rigidly attaching it thereto, the carcass moves between multiple stations and fixtures and experiences a series of load-weld-load sequences. Unfortunately, each framing and fixture operation contributes to the increased dimensional variation by establishing the spatial and geometric relationship between that particular new component(s) and the rest of the carcass therefore further contributing to positional variability. Furthermore, as initial welds are covered up by subsequent sub-assembly components, the initial welds become closed off or "closed out", making them inaccessible and unavailable for realignment.

Conventional assembly operations have employed one of three primary methods for managing the total dimensional variability of BIWs. First, they can spend more time manufacturing parts to exacting tolerances. For example, complex assembly elements can be designed and manufactured at significantly higher costs.

Secondly, assembly operations can reduce the speed of the assembly line. By spending more time or adding more labor during the assembly, a slight improvement could be predicted to ensure fit and finish quality. However, this slows down overall vehicle production and adds. significant cost.

A third alternative is to live with the assembly problems in the short term and instead wait to establish or correct the relationships of the BIW after the closure surfaces are integrated. Conventional processes currently use relationship mechanisms such as a fender setting machine in order to bend or twist the combined BIW and closure surfaces and establish relationships. Although this type of rework can make the closure surfaces cosmetically acceptable, it leaves open the opportunity for functional problems, such as squeaks and rattles, fit and finish variation such as wind noise, water leaks, and customer dissatisfaction.

A number of prior art inventions have described different methods for reducing the total dimensional variation of the BIW. Some prior art inventions have disclosed the limited use of hydroformed tubular members in front end assemblies to combine functions into a single part. For example, Gerricke et al., U.S. Pat. No. 6,416,119, describes a vehicle front end constructed using hydroformed tubes. However, these methods have yet to be integrated to reduce the number of "load-weld" sequences and ignore the total dimensional variability. Rather, this manufacturing strategy is still based on continuing the conventional load-weld-load processes.

In contrast, U.S. Pat. No. 6,360,421 to Oatridge et al., describes a method for reducing dimensional variation during the manufacturing of an automobile BIW from a plurality of components. The method comprises forming a substantially rigid structure from some of the plurality of components. For each of the remaining components, the further steps of referencing from said rigid sub-assembly a desired position from said each remaining component on said initial structure, and thereafter, affixing said each remaining component to said rigid sub-assembly at said desired position whereby the tolerance of said manufactured assembly is reduced. However, similar to conventional assembly operations, these methods have yet to be integrated to reduce the number of "load-weld-load" sequences.

What is needed is an improved method for reducing the total dimensional variation of BIWs during assembly and shifts the paradigm by reducing the number of "load-weld" sequences.

SUMMARY OF THE INVENTION

The present invention is a method of manufacturing an assembly comprising at least two components, the method comprising the steps of: attaching the vehicle components together to form a combined structure; loading the combined assembly into a single framing fixture; establishing the spatial relationships between each of the vehicle components of the combined structure with the single framing fixture; and fixedly securing each of the components of the combined structure to form a rigid structure wherein the spatial relationships between each of the vehicle components are finalized in the single framing fixture.

One advantage of the present invention is the elimination of the load-weld-load sequences used in conventional BIW framing processes. The conventional process is labor and floor space intensive. The variable dimensional variability contributed by multiple framing fixtures is eliminated. The elimination of multiple framing fixtures results in improved floor space efficiency. Furthermore, the customized fitting of closure panels into openings that are not properly dimensioned by a hayrack fixture or a fender setting fixture is reduced.

Another advantage of the present invention is an improved BIW assembly free of close-out welds. The present invention provides access to all of the BIW securing points which need to be affixed together within a single framing fixture.

Another advantage of the present invention is the improved dimensional variation of BIW structure improving body closure fit and finish Resulting in less water leakage, quieter ride due to less wind and body noise, and longer product life with reduced effects of corrosion and wear.

DETAILED DESCRIPTION OF THE PREFERRED EMBODIMENTS

Figure 1:
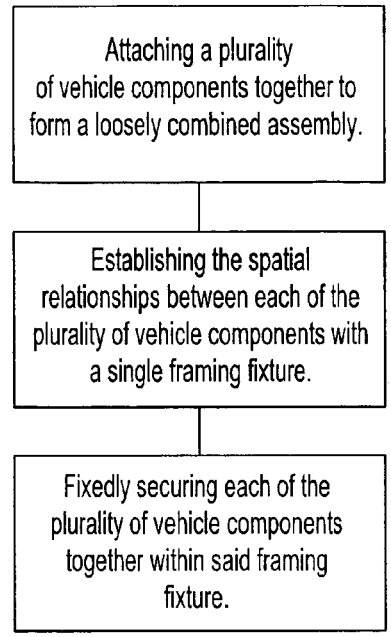
FIG. 1 is a block diagram showing the steps of one embodiment of the disclosed invention.

Referring now to FIG. 1, the basic steps of a preferred embodiment of making a body-in-white (BIW) are set forth schematically. It should be understood that some of the steps may be supplemented with additional steps or that the order of the some of the steps may be changed without deviating from the inventive concept. It should further be understood that the inventive concept may be applied to other types of assembly processes such as body-on-frame assemblies or various component sub-assemblies.

The description and design of the vehicle components comprising the BIW assembly in a prior co-pending patent application, "Modular Tubular Front End Structure For Automobiles and Method for Making The Same", U.S. patent application Ser. No. 10/859,687 is incorporated herein by reference.

Figure 2:
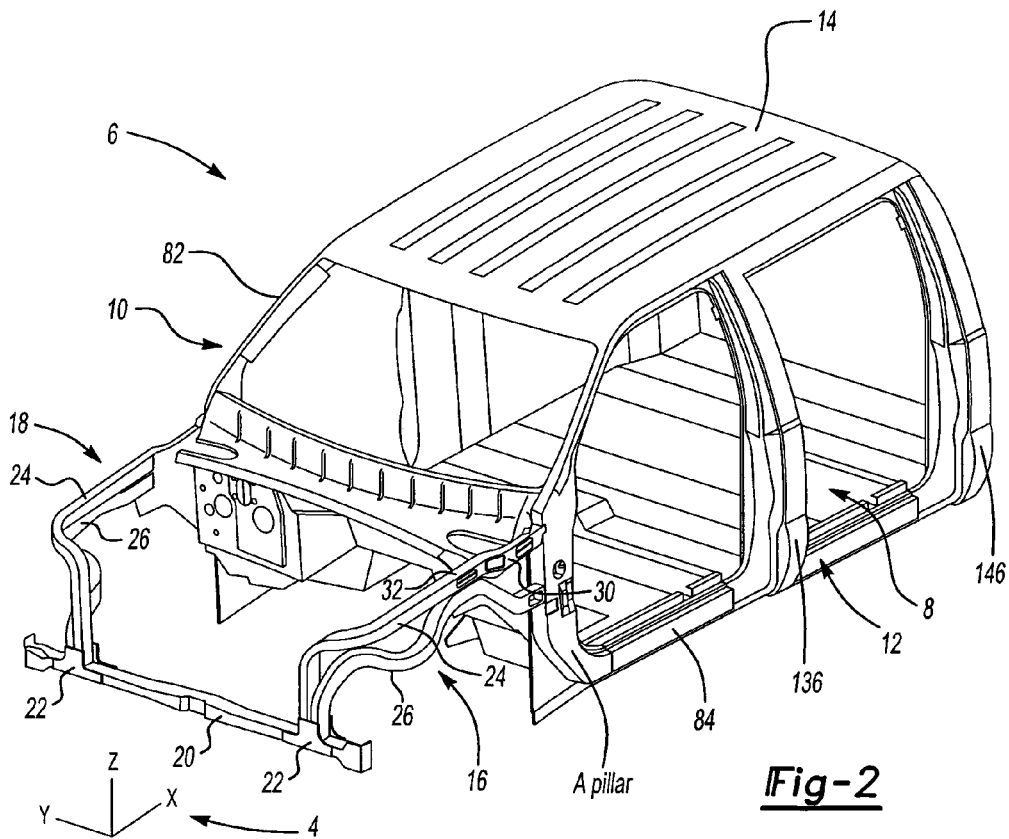
FIG. 2 is a perspective view of a body-in-white assembly according to one embodiment of the present invention.
Figure 7:
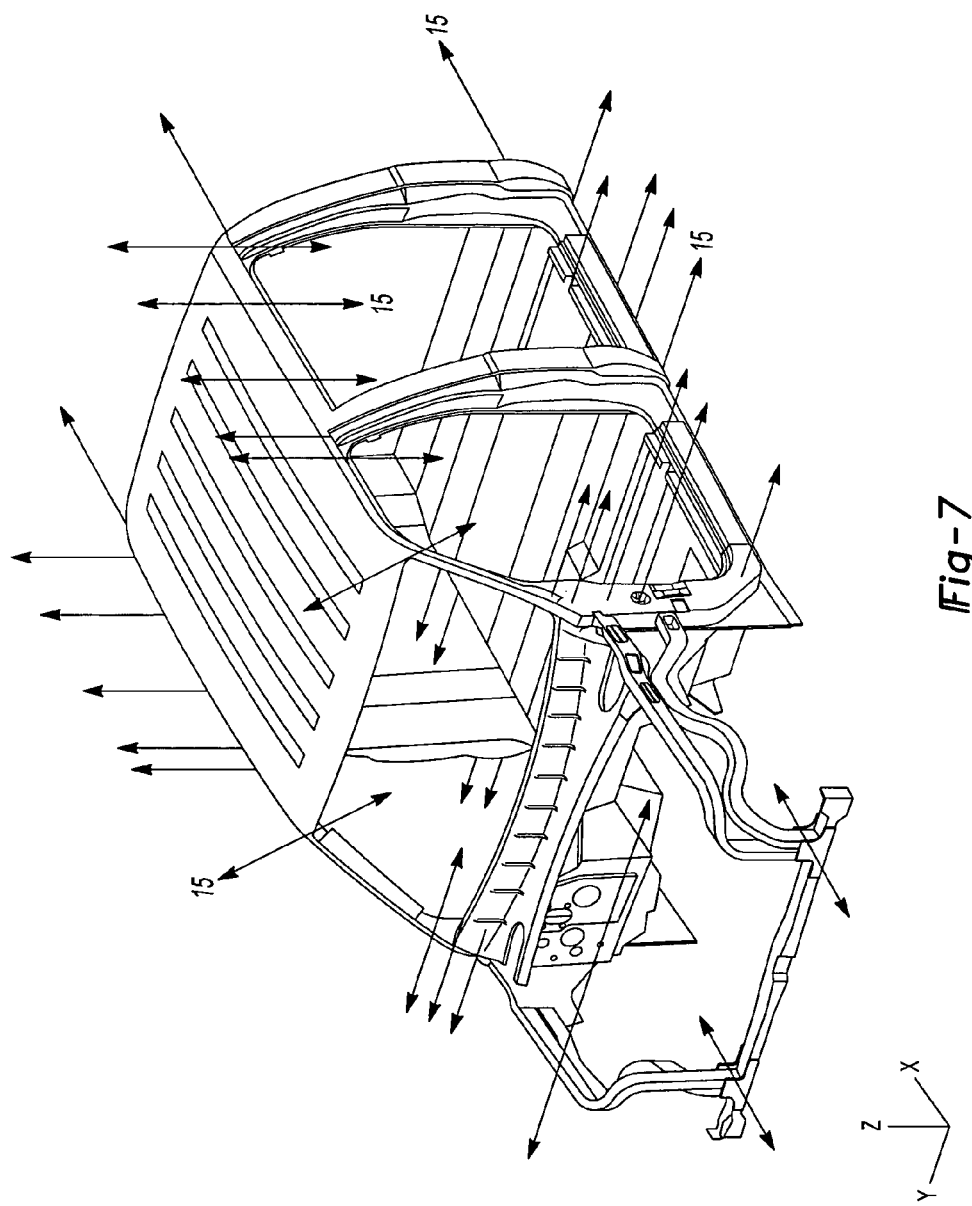
FIG. 7 is a perspective view of an improved body-in-white assembly made according to one embodiment of the present invention.

Referring now to FIG. 2, a directional frame 4 is shown to facilitate the description of the invention with the x-axis along the longitudinal direction of the BIW (pointing rearward), y-axis along the lateral direction of the BIW (pointing away from the US driving side, i.e., to the right), and the z-axis along the vertical direction of the BIW (pointing upward). A preferred embodiment BIW assembly is generally identified by reference numeral 6 and comprises an underbody portion 8, right bodyside 10, left bodyside 12, roof 14, left tube structure 16, right tube structure 18, and a radiator support 20, with each sub-assembly component of the BIW geometrically located in its final assembly position. Right and left side designations as used herein refer to the sides of the vehicle relative to the driver (United States convention) of the vehicle. The body-in-white 6 may, in the alternative, include additional sub-assembly components such as a back panel, cowl top outer, etc. Each of the BIW sub-assembly components are designed to facilitate being located and set with respect to its geometry within a single framing fixture at one assembly station. In FIG. 7, representative securing locations 15 are indicated by welding arrows to show the accessible method by which the frame may be permanently secured together without close-out welds. Each of the BIW assembly components and a preferred method of assembly will be further described below.

Figure 3:
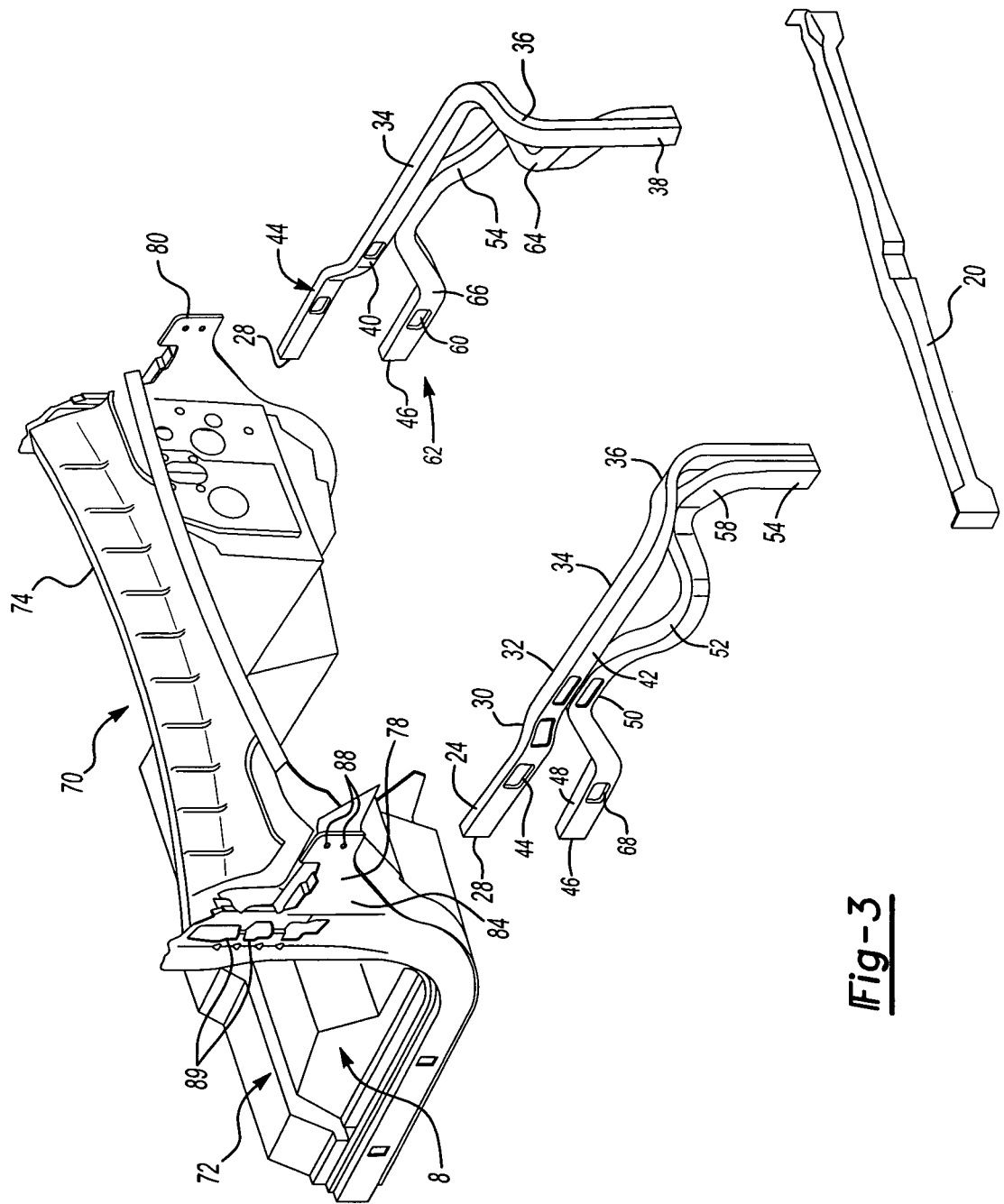
FIG. 3 is a fragmentary perspective view of a portion of a body-in-white assembly made according to one embodiment of the present invention.

Referring to FIGS. 2 and 3, one embodiment of the left tube structure 16 and the right side tube structure 18 is shown. The side tube structures 16,18 are mirror images of each other. Each side tube structure extends in a longitudinal direction generally further forward of the underbody portion 8. The tube structures are hydroformed. They can also be formed from extrusions, seamless tubes or seamed tubes. The tubes may be formed with varying thicknesses throughout their length to save weight.

The pair of tube structures 16,18 each contain a plurality of surfaces formed and manufactured to tight tolerances. The tube structures combine together component functions. from conventional assembly processes which were shared across multiple parts. The left and right side tube structures each comprise an upper tube 24 and a lower tube 26. In the preferred embodiment shown in FIGS. 2 and 3, each upper tube 24 and lower tube 26 is formed in a rectangular shape providing each tube with four distinct sides. Each upper tube 24 comprises a body end 28, a first connecting point 30, a second connecting point 32, a support portion 34, an upper cooling portion 36, and a front end 38. The upper tube 24 has an inboard surface 40, an outboard surface 42, a top surface 44, and a bottom surface 46. The outboard surface 42 has a plurality of access holes 48 that provide clearance for installation, as well as for forming securing operations. The upper tube 24 extends from a higher relative vertical position to a lower vertical position between the upper cooling portion 36 and the front end 38.

Each lower tube 26 of the left and right side tube structures 16,18 comprises a body end 50, a first connecting point 52, a second connecting point 54, a support portion 56, and a front end 58. Each lower tube 26 has an inboard surface 60, an outboard surface 62, a top surface 64, and a bottom surface 66. The lower tube has a plurality of access holes 68 that provide access for performing welding or other assembly operations without the use of close out welds associated with the assembly of the front end in a single geometry setting fixture.

The lower tube 26 and the upper tube 24 are secured together in order to form each of the tubular structures 16,18. In the preferred embodiment of FIG. 3, a bottom surface 46 of the upper tube 24 and the top surface 64 of the lower tube 26 are secured to each other along the respective reference surfaces to allow the upper tube second connecting point 32 and the lower tube second connecting point 54 to be disposed in close proximity to each other. Furthermore, the inboard surface 60 of the lower tube 26 and the outboard surface 42 of the upper tube 24 are secured together in close proximity to the upper tube front end 38 and the lower tube front end 58, respectively. The upper tube 24 is formed to be inboard of the lower tube 26 such that the upper tube front end 38 is disposed in a vertical plane inboard of the upper body end 28. Similarly, the lower tube front end 58 may be located in a vertical plane more inboard than the lower tube body end 50.

The radiator support structure 20 generally extends transversely across the front of the vehicle and perpendicular to the longitudinal direction of the side tube structures 16 and 18. Each side tube structure is independently connected to the radiator support structure 20 by a U-shaped bracket 22 or similar connector. The tube is hydroformed. It can also be formed from extrusions, seamless tubes or seamed tubes. The tube may be formed with varying thicknesses throughout its length to save weight.

Referring to FIGS. 2 and 3, the underbody portion 8 will now be further described. The underbody portion 8 comprises a dashboard portion 70 and a floor portion 72. The dashboard portion 70 comprises a cowl inner structure 74 along its forward portion. A pair of cowl sides 78,80 are each attached longitudinally to the cowl inner 74.

The right cowl side 78 includes a cowl side flange 82 that extends in an outboard direction and forms essentially a 90 degree angle with the cowl side 78. A portion of the right cowl side 78 extends forward longitudinally and contains a securing point 88. A plurality of vertical clearance holes 89 are formed in each cowl side to allow for access to the A-pillars during assembly eliminating close-out welds (described below). The left cowl side 80 is a mirror image of the right cowl side 78.

The cowl inner 74 extends laterally in a horizontal plane between the pair of cowl sides 78,80. A peripheral flange 92 extends in an outboard direction from each cowl inner end portion 90,91 of the cowl inner 74. The cowl inner 74 is attached to the left cowl side 80 and the right cowl side 78. Each cowl inner end portion contains a peripheral flange 92 which is fabricated to mate with the corresponding cowl side flanges 82 located on each cowl side 78,80. The underbody portion 8 may be formed from sheet metal or structural plastic components that are combined to form an assembly.

Figure 5:
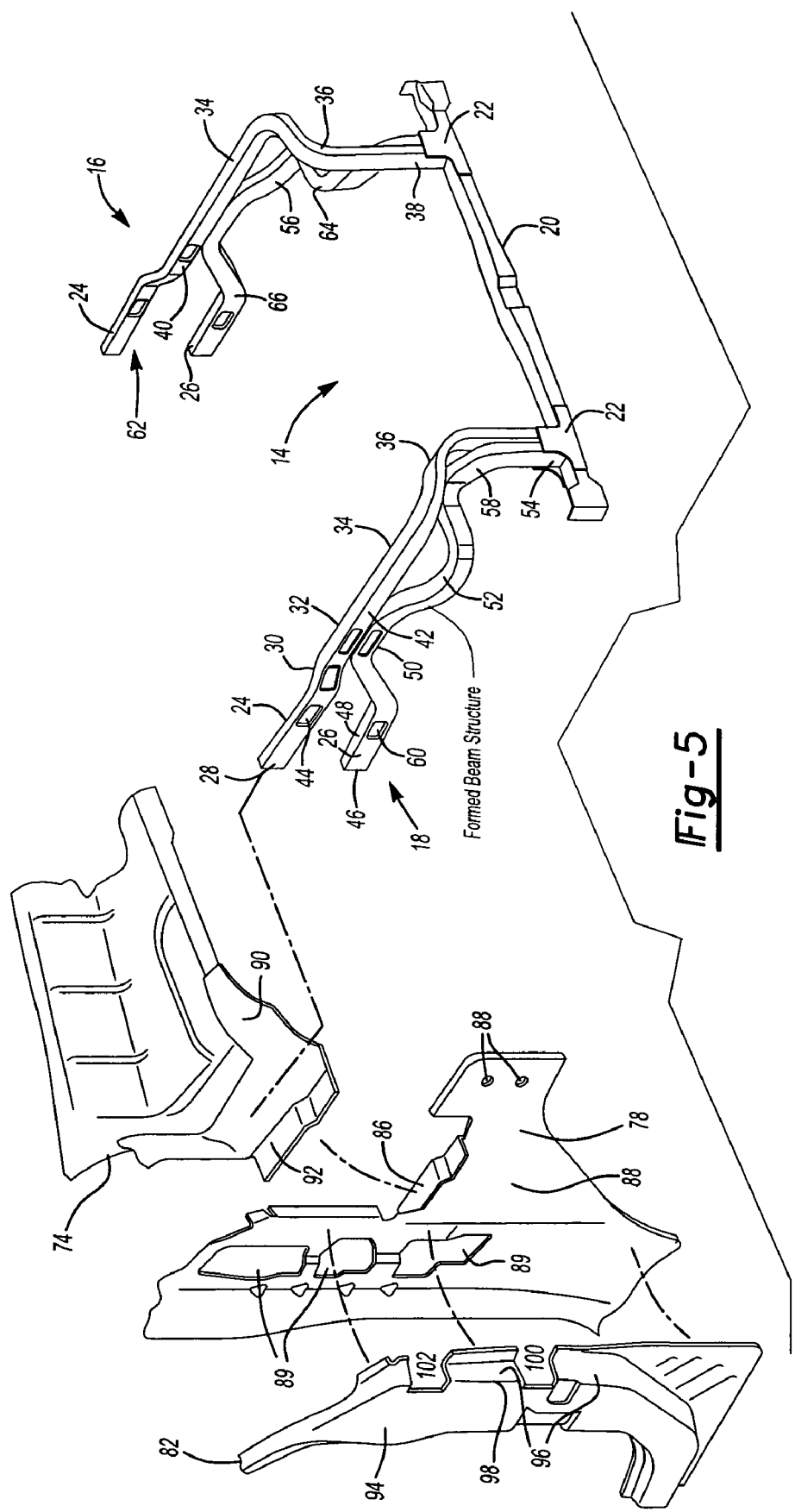
FIG. 5 is a exploded perspective view of a portion of a body-in-white according to one embodiment of the present invention.

Referring to FIGS. 2 and 5, a preferred embodiment of the pair of bodysides 10,12, will be further described. Each bodyside 10,12 extends in a longitudinal direction generally rearward of the tube structures 16,18. The bodysides are mirror images of each other. The bodysides each comprise an A-pillar 104,106, a B-pillar 234,136 and a C-pillar 144,146. Each A-pillar comprises a side wall 108 that extends generally in a vertical and longitudinal plane. A transverse wall 110 extends inwardly from a forward edge 112 of the A-pillar toward the cowl side inner 78. The transverse wall 110 has a lower clearance opening 114 and an upper clearance opening 116, separated by a portion of the transverse wall 110. The bodysides 10,12 may be formed from sheet metal or structural plastic components that are combined to form an assembly.

Figure 4:
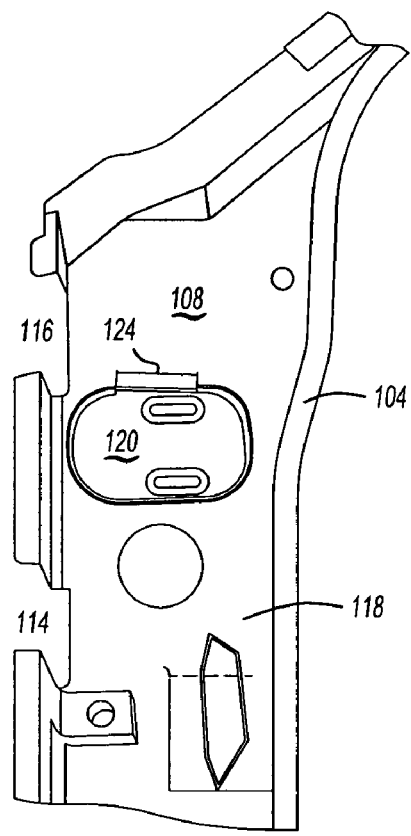
FIG. 4 is a fragmentary perspective view of an interior portion of a body-in-white A-pillar according to one embodiment of the present invention.

Referring to FIG. 4, an interior perspective of the bodyside right A-pillar 104 is shown. An interior surface 118 of the side wall 108 is shown supporting a hinge reinforcement bracket 120. Bracket 120 is attached to the interior surface 118 of each A-pillar. The bracket is attached to the A-pillar by either fasteners or a welding process. A perpendicular flange 122 of the upper hinge reinforcement bracket 120 extends inwardly from the interior surface 118. The flange is located to be level with the lower edge of the clearance opening 114.

Referring to FIG. 2, a preferred embodiment of the roof 14 will be further described. The roof portion lies horizontally in the z-axis plane and extends along the x-axis. The roof 14 may be formed from sheet metal or structural plastic components that are combined to form an assembly.

Now a preferred method for combining together BIW vehicle components to form a loosely combined structure will be further described. A loosely combined structure is defined as having a first component being combined with one or more additional components in a state which still allows each component to maintain its ability to adjust its positional relationship to the other components prior to a final fixed state. The preferred method for combining components together is by toy-tabbing. Toy-tabbing is generally known within the industry as using discreet metal "tabs" to loosely hold BIW components in place during pre-assembly operations. The individual components are free to move in all three directions frame directions (x,y,z). Toy-tabbing does not involve welding. Other methods of loosely combining individual components including welding may be used as well. The toy-tabs may be formed with sheet or other flexible products.

As a preliminary input, all bodyside, underbody, and roof mating surfaces have been toleranced to a predetermined dimension. The side tube and radiator support mating surfaces have also been toleranced.

FIG. 5 shows an exploded view of a portion of the lower radiator support structure is loosely combined with the tube structures 16,18. Again, the radiator support structure 20 generally extends transversely across the front of the vehicle and perpendicular to the longitudinal direction of the side tube structures 16 and 18. The top surface of the lower tube 64 and the top surface of the upper tube 44 serve as securing surfaces for locating the lower radiator support 20 to each of the side tubes 16 and 18 using the pair of U-shaped brackets 22.

Referring to FIG. 5, includes a fragmentary view of one of the left and right tube structures 16,18 and where they could be loosely connected to the body portion 12. The cowl side flange 82 and the peripheral flange 92 are arranged together. The upper tube 24 is toy tabbed to rest on top of the peripheral flange 92. The first connecting point 30 is disposed on the peripheral flange 86. The first connecting point 30 is located on the bottom surface 46 of each of the upper tubes 24. Each bottom surface 46 located on both the right and left upper tubes 24 serve as a surface for connecting the cowl side and cowl inner to the side tube structures 16,18. The securing point 88 is located on each cowl side and is disposed adjacent to the upper tube second connecting point 32 and the lower tube second connecting point 54. The inboard surface 40 of the upper tube serves as a mating surface for the second connecting point 32. Similarly, the inboard surface 60 of the lower tube serves as a mating surface to the cowl side surface 84. The arrangement is repeated with the opposite side tube structure.

The tubular structures 16, 18 connections to the underbody 8 shall be described in detail with specific reference to FIGS. 1, 2, and 4. The upper tube 24 rests on top of the peripheral flange 92. The first connecting point 30 is disposed on the peripheral flange 92. Each upper tube can be secured to each peripheral flange 92 by conventional means through the access hole 48. The securing point 88 located on each cowl side is disposed adjacent to the upper tube second connecting portion 32 and the lower tube second connecting point 50. The tubes are toy-tabbed to the underbody portion 8 as previously described above.

Figure 6:
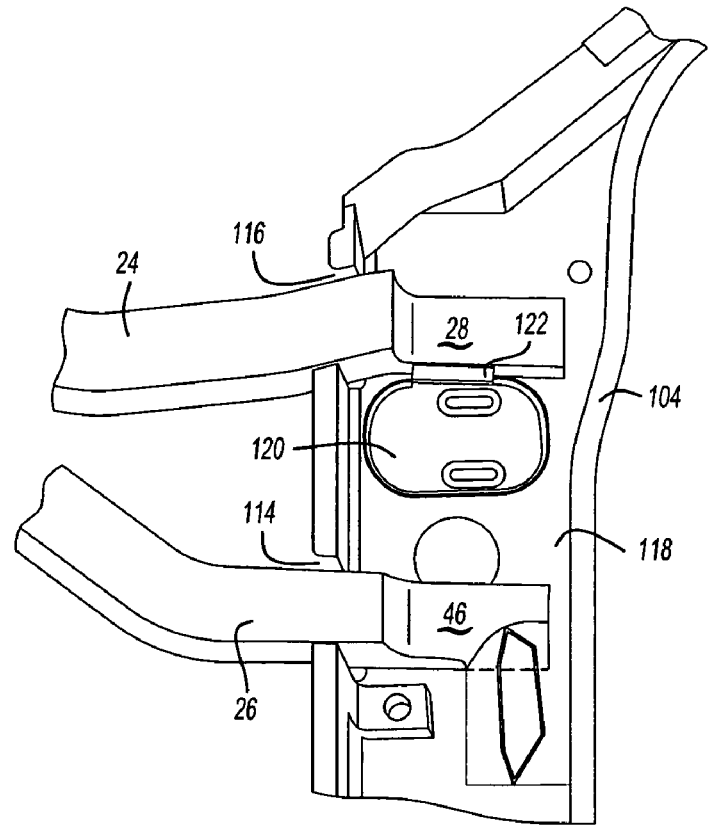
FIG. 6 is a fragmentary interior view of a portion of an A-pillar according to one embodiment of the present invention.

A preferred method of loosely combining the bodyside portions of the BIW carcass will now be further described. A pair of laterally spaced A-pillars 104,106 are positioned such that each is outboard of the respective cowl side. The left and right cowl side 80,78 and the left and right A-pillars 106,104 are mirror images of each other. Referring to FIG. 6, the right A-pillar 104 is toy tabbed to the body end portion 50 and the body end portion 28 of the side tube structure. The upper tube 24 passes through the forward clearance opening 116 of the A-pillar and rests on a flange surface 124 of the upper hinge reinforcement bracket 120. The lower tube 26 extends through the lower clearance opening 114 of the A-pillar 104 and contacts the A-pillar side wall 108 to which it is loosely secured.

The roof 14 is attached in a horizontal plane (xy plane) to the upper portion of the bodysides as shown in FIG. 7. If a back panel is used, it is attached in a vertical plane between the rear portions of the bodysides.

Figure 8:
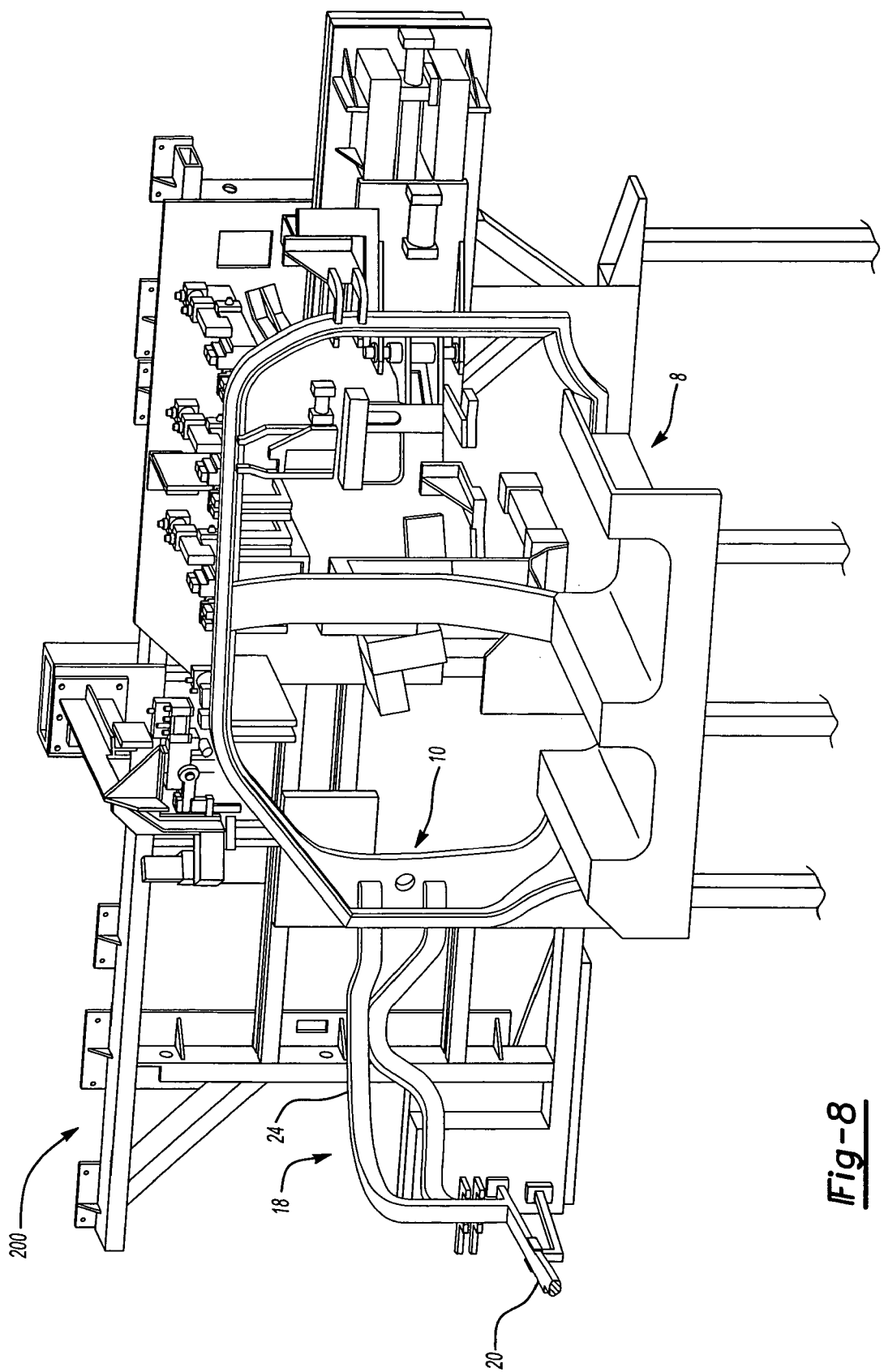
FIG. 8 is a cross sectional view of a portion of a body-in-white engaged by a single set framing fixture according to one embodiment of the present invention.

FIG. 8 shows a cross sectional view of a portion of a single framing fixture 200 engaging a portion of the BIW. The spatial relationship of the right tube structure 18 to the right bodyside 10 is set using datums located on both components.

The BIW carcass is now loosely assembled together and ready to for all of the spatial and geometric relationships of the vehicle components to be located and set by the single framing fixture. The BIW components have not been permanently fixed together and each can be manipulated to achieve the appropriate geometric relationship with respect to each of the other components. The BIW components are free to move in three dimensions (x,y,z) in order to appropriately locate itself within the framing fixture. The assembly fixture pin and net pads should be toleranced with ±0.15 mm to represent toll location repeatability for the assembly fixture. A tolerance of 0.15 nominal float between pin to hole and pin to slot should be applied between the framing fixture and each BIW component.

Referring to FIGS. 5,6, and 8, the right tube structure 18 engages the right bodyside 10 when the upper tube 24 passes through the forward clearance opening 116 of the A-pillar and rests on a flange surface 124 of the upper hinge reinforcement bracket 120. The lower tube 26 extends through the lower clearance opening 114 of the A-pillar 104 and engages the A-pillar side wall 108. The underbody portion 12 also engages the right tube structure 16. The upper tube 24 engages the top of the peripheral flange 92. The first connecting point 30 is disposed on the peripheral flange 92. The second securing point 88 located on each cowl side is disposed adjacent to the upper tube second connecting portion 32 and the lower tube second connecting point 50. The right tube structure 16 is free to manipulate in the x,y, or z directions to allow for optimally setting the relationship of the right tube structure 16, the underbody structure 8, and the right bodyside structure 10. The left tube structure 18 is the mirror image of the right tube structure 16 and although not described here, has the same advantages.

The spatial relationship of the right tube structure 16 to the left tube structure 18 is set using datums located on both components. The height of both structures as well as the cross car distance (y-direction) of the body-in-white subassembly, can be located and geometrically set. The left and right side tube structures 16,18 are adjusted vertically (Z-direction) up and down and horizontally in and out (y-axis) to obtain the final position. Similarly, the spatial relationship of the roof 14 and the bodysides 10,12 are set using datums located on each component.

Once all of the geometric and spatial relationships between each BIW components are set, the BIW can be secured together by conventional means, such as spot welding, mig welding, etc. Access holes such as 48, 68 in the upper and lower tubes respectively, provide for the use of conventional securing methods such as spot welding to be used.

While the best mode for carrying out the invention has been described in detail, those familiar with the art to which this invention relates will recognize various alternative designs and embodiments for practicing the invention as defined by the following claims.

What is claimed:

1. A method of manufacturing an assembly comprising at least two components, the method comprising the steps of:
   loosely connecting all of the vehicle components of the assembly together to form a loosely combined structure in which each individual vehicle component is positionally adjustable to change the positional relationship thereof relative to the other individual components;
   loading the loosely combined structure into a single framing fixture while maintaining positionally adjustable relationships between the respective loosely connected components;
   establishing spatial relationships between each of the vehicle components of the combined structure with the single framing fixture; and
   fixedly securing each of the components of the combined structure to form a rigid assembly wherein the spatial relationships between each of the vehicle components are finalized in the single framing fixture and wherein the method assures that the resulting combined structure is free from close-out welds.

2. The method of claim 1, wherein the assembly is a body-in-white assembly.

3. The method of claim 1, wherein the step of loosely connecting the vehicle components to form the loosely combined structure is conducted at a plurality of sequentially arranged assembly stations.

4. The method of claim 1, wherein each of the vehicle components includes toy tabs.

5. The method of claim 4, wherein the step of loosely connecting the vehicle components includes the step of combining the vehicle components together using the toy tabs.

6. The method of claim 1, wherein the step of fixedly securing each of the vehicle components to form the rigid assembly includes the step of spot welding.

7. A method of manufacturing an assembly in a single framing fixture, the assembly having a plurality of structural components formed together to support a plurality of closure panels, each of the structural components having at least one securing point, the method comprising the steps of:
   loosely connecting the structural components together in a loosely combined structure in which each individual vehicle component is positionally adjustable to change the positional relationship thereof relative to the other individual components by using toy tabs formed on each of the vehicle components;
   loading the loosely combined structure in the single framing fixture fixture while maintaining positionally adjustable relationships between the respective loosely connected components;
   establishing the spatial relationships between each of the plurality of structural components in the single framing fixture; and
   fixedly securing all of the securing points together to form a rigid structure wherein the spatial relationships between each of the structural components is set by the single framing fixture.

8. The method of claim 7, wherein the assembly is a body-in-white assembly.

9. The method of claim 7, wherein the plurality of structural components are attached together to form the combined structure at a plurality of sequentially arranged assembly stations.

10. The method of claim 7, wherein the plurality of structural components are fixedly secured together by spot welding.

11. A method of manufacturing an assembly for a motor vehicle having a plurality of vehicle components, the spatial relationships between the vehicle components being established in a single framing fixture, the method comprising the steps of:
- designing the plurality of vehicle components having securing points that are accessible when loaded in the single framing fixture;
- attaching the vehicle components together to form a loosely combined structure in which each vehicle component is positionally adjustable to change the positional relationship thereof relative to the other individual components;
- establishing the spatial relationship between each of the vehicle components of the loosely combined structure with the single framing fixture; and
- fixedly securing each of the vehicle components to form a rigid structure wherein all of the securing points are accessible throughout engagement with the single framing fixture.

12. The method of claim 11, wherein the assembly is a body-in-white assembly.

13. The method of claim 11, wherein the plurality of vehicle components are attached together to form the loosely combined structure at a plurality of sequentially arranged assembly stations.

14. The method of claim 11, wherein each of the plurality of vehicle components comprises toy tabs.

15. The method of claim 14, wherein the plurality of vehicle components are loosely combined together using the toy tabs.

16. The method of claim 11, wherein the plurality of vehicle components are fixedly secured together to form the rigid structure by spot welding.

\* \* \* \* \*